(12) United States Patent
Nakamura et al.

(10) Patent No.: US 6,674,360 B2
(45) Date of Patent: Jan. 6, 2004

(54) APPARATUS FOR CONTROLLING VEHICLE TRANSMISSION

(75) Inventors: Toru Nakamura, Aichi (JP); Masaki Hayashi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 17 days.

(21) Appl. No.: 10/080,929

(22) Filed: Feb. 22, 2002

(65) Prior Publication Data

US 2002/0135469 A1 Sep. 26, 2002

(30) Foreign Application Priority Data

Feb. 23, 2001 (JP) .................................... 2001-048229

(51) Int. Cl.$^7$ ................................................ B60Q 1/00

(52) U.S. Cl. ...................... 340/435; 340/903; 701/96

(58) Field of Search ................................ 340/435, 436, 340/903, 904; 701/96; 180/167, 169

(56) References Cited

U.S. PATENT DOCUMENTS

| | | | | | |
|---|---|---|---|---|---|
| 5,659,304 | A | * | 8/1997 | Chakraborty | 340/903 |
| 6,161,073 | A | * | 12/2000 | Tange et al. | 701/96 |
| 6,178,372 | B1 | * | 1/2001 | Tabata et al. | 701/97 |
| 6,275,772 | B1 | * | 8/2001 | Sugimoto et al. | 701/301 |
| 6,415,230 | B1 | * | 7/2002 | Maruko et al. | 701/301 |
| 6,484,087 | B2 | * | 11/2002 | Shirai et al. | 701/96 |
| 6,535,114 | B1 | * | 3/2003 | Suzuki et al. | 340/435 |

* cited by examiner

*Primary Examiner*—John Tweel
(74) *Attorney, Agent, or Firm*—Patterson, Thuente, Skaar & Christensen, P.A.

(57) ABSTRACT

An apparatus for controlling a vehicle transmission includes a camera that generates an image signal indicating the situation in front and behind the vehicle, a shift operation body that generates an operation signal indicating a shift operation position of the shift operation body that is operated by a driver, and a control unit that controls the transmission in accordance with the operation signal. The control unit determines whether movement of the vehicle is obstructed on the basis of the image signal and invalidates the operation signal to prohibit the operation of the transmission.

11 Claims, 4 Drawing Sheets

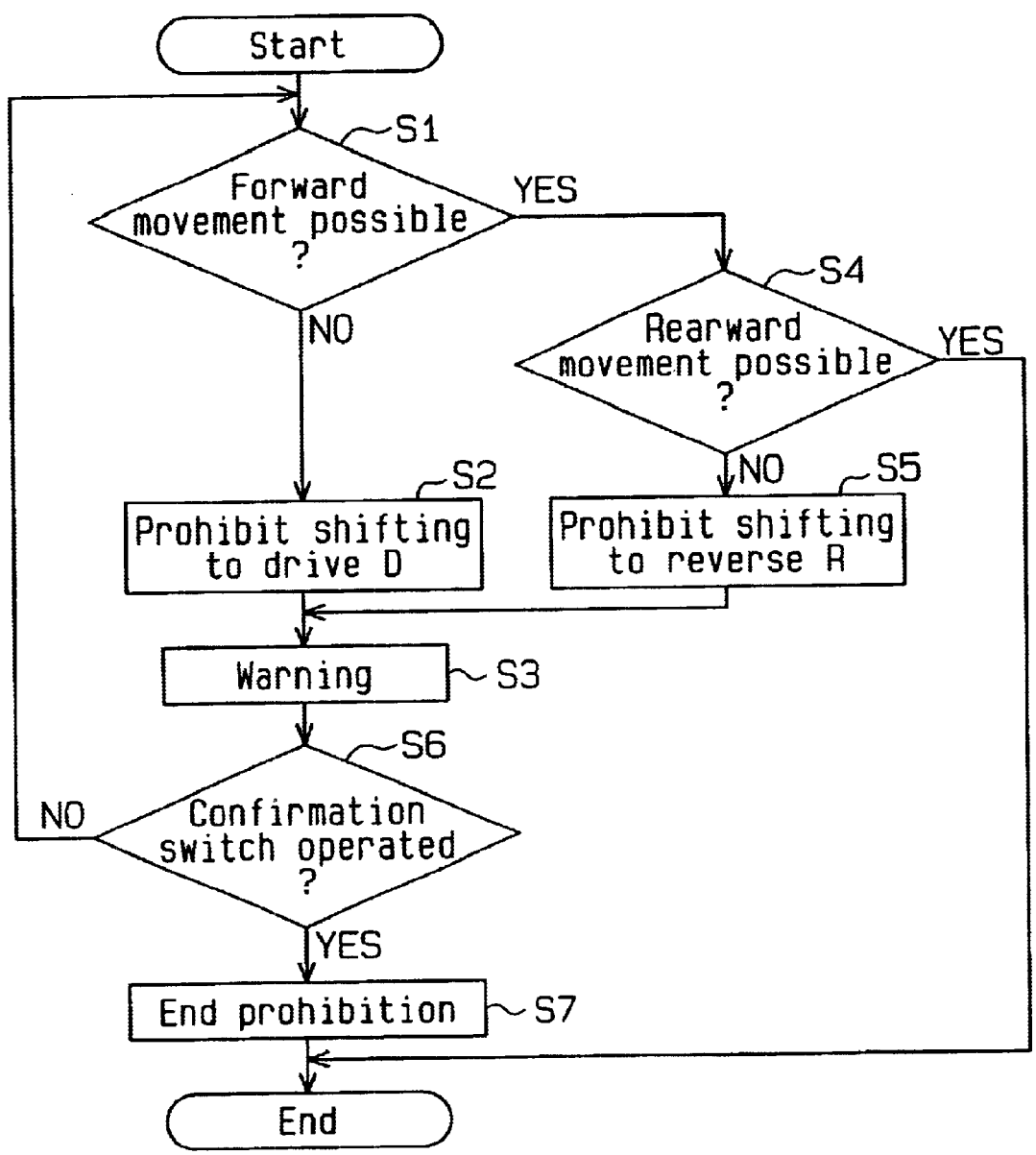

APPARATUS FOR CONTROLLING VEHICLE TRANSMISSION

BACKGROUND OF THE INVENTION

The present invention is related to an apparatus for controlling a vehicle transmission, and more particularly to an apparatus for electrically controlling a transmission of a vehicle.

Conventionally, a transmission control apparatus of a shift-by wire type vehicle that shifts the connection of gears in a transmission through electric control has been proposed. In this type of vehicle transmission control apparatus, when a driver operates a shift operation body in the vehicle passenger compartment, a detection signal indicating the operation position is generated. An actuator is operated on the basis of the detection signal to shift the gear connection of the transmission. In such vehicle transmission control apparatus, a mechanical structure, such as a link mechanism, is not necessary and the apparatus can easily be manufactured with a smaller size. Therefore, the shift operation body and passenger compartment accessories can be arranged with fewer restrictions. This obtains a comfortable passenger compartment.

When the vehicle starts to move, it is difficult for a driver seated on the driver's seat to see front and rear obstacles located near the vehicle.

In recent years, a vehicle having a back monitor visualizing the rear situation has been proposed. However, in such vehicles, if the shift range is shifted to "R" even though an obstacle is shown on the monitor, the vehicle transmission control apparatus shifts the gear connection of the transmission to "R" accordingly.

SUMMARY OF THE INVENTION

It is an object of the present invention to provide a vehicle transmission control apparatus capable of coping with situations in which there are obstacles.

In a first perspective of the present invention, an apparatus for controlling a vehicle transmission is provided. The control apparatus includes a detection unit for detecting a situation of at least one of a front side and a rear side of the vehicle and generating a detection signal, a shift operation body operated by a driver for generating an operation signal indicating a shift operation position, and a control unit connected to the detection unit and the shift operation body for controlling the transmission in accordance with the operation signal. The control unit determines whether movement of the vehicle is obstructed on the basis of the detection signal and invalidates the operation signal to prohibit the operation of the transmission when the movement of the vehicle is obstructed.

In a second perspective of the present invention, an apparatus for controlling a vehicle transmission is provided. The control apparatus includes a detection unit for detecting a situation of at least one of a front side and a rear side of the vehicle and generating a detection signal, a shift operation body operated by a driver for generating an operation signal indicating a shift operation position, and a control unit connected to the detection unit and the shift operation body for controlling the transmission in accordance with the operation signal. The control unit determines whether movement of the vehicle is obstructed on the basis of the detection signal and generates a driving signal when the movement of the vehicle is obstructed. The control apparatus further includes a prohibiting means connected to the control unit for prohibiting the operation of the shift operation body by the driver in response to the driving signal.

In a third perspective of the present invention, a method for controlling a vehicle transmission is provided. The method includes the steps of detecting a situation of at least one of a front side and a rear side of the vehicle and generating a detection signal, generating an operation signal indicating a shift operation position of a shift operation body operated by a driver, controlling the transmission in accordance with the operation signal, determining whether movement of the vehicle is obstructed on the basis of the detection signal, and invalidating the operation signal when the movement of the vehicle is obstructed to prohibit operation of the transmission.

In a fourth perspective of the present invention, a method for controlling a transmission of a vehicle comprising the steps of detecting a situation of at least one of a front side and a rear side of the vehicle and generating a detection signal, generating an operation signal indicating a shift operation position of a shift operation body operated by a driver, controlling the transmission in accordance with the operation signal, determining whether movement of the vehicle is obstructed on the basis of the detection signal, and prohibiting the operation of the shift operation body by the driver when the movement of the vehicle is obstructed.

BRIEF DESCRIPTION OF THE DRAWINGS

FIG. 6 is a flowchart illustrating the operation of a vehicle transmission control apparatus according to a further embodiment of the present invention.

DETAILED DESCRIPTION OF THE PREFERRED EMBODIMENTS

Figure 1:
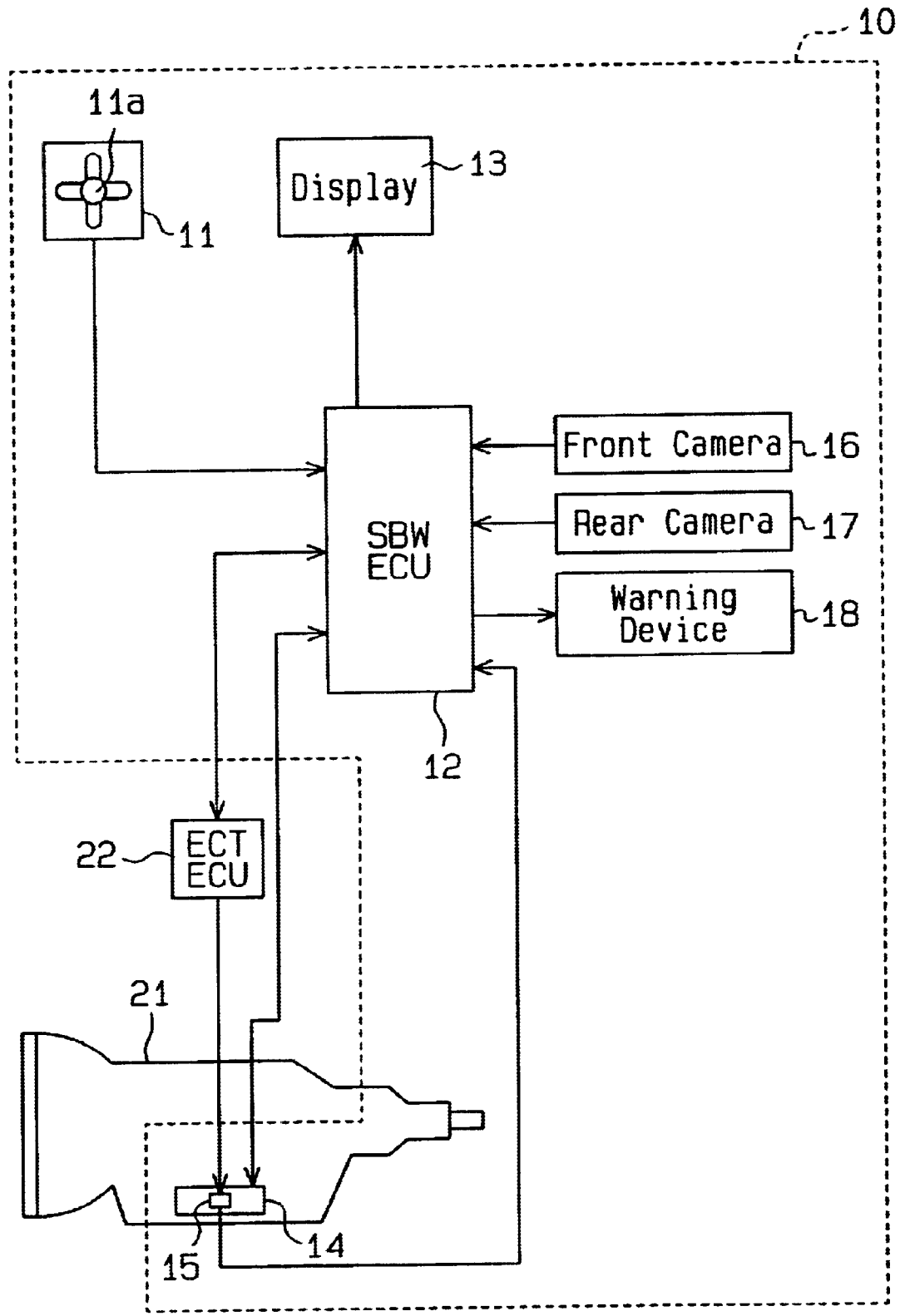
FIG. 1 is a brief block diagram of a vehicle transmission control apparatus according to a first embodiment of the present invention.

As shown in FIG. 1, a vehicle transmission control apparatus 10 according to a preferred embodiment of the present invention is provided in a vehicle 1 (refer to FIG. 2 and FIG. 3) and the vehicle transmission control apparatus 10 has a shift operation body 11, a transmission control electronic control unit (SBW-ECU) 12, a display 13, a transmission hydraulic actuator 14, a range position detection device 15, a front camera 16, a rear camera 17, and a warning device 18. The shift operation body 11, the display 13, the transmission hydraulic actuator 14, the range position detection device 15, the front camera 16, the rear camera 17, and the warning device 18 are electrically connected to the SBW-ECU 12.

Figure 2:
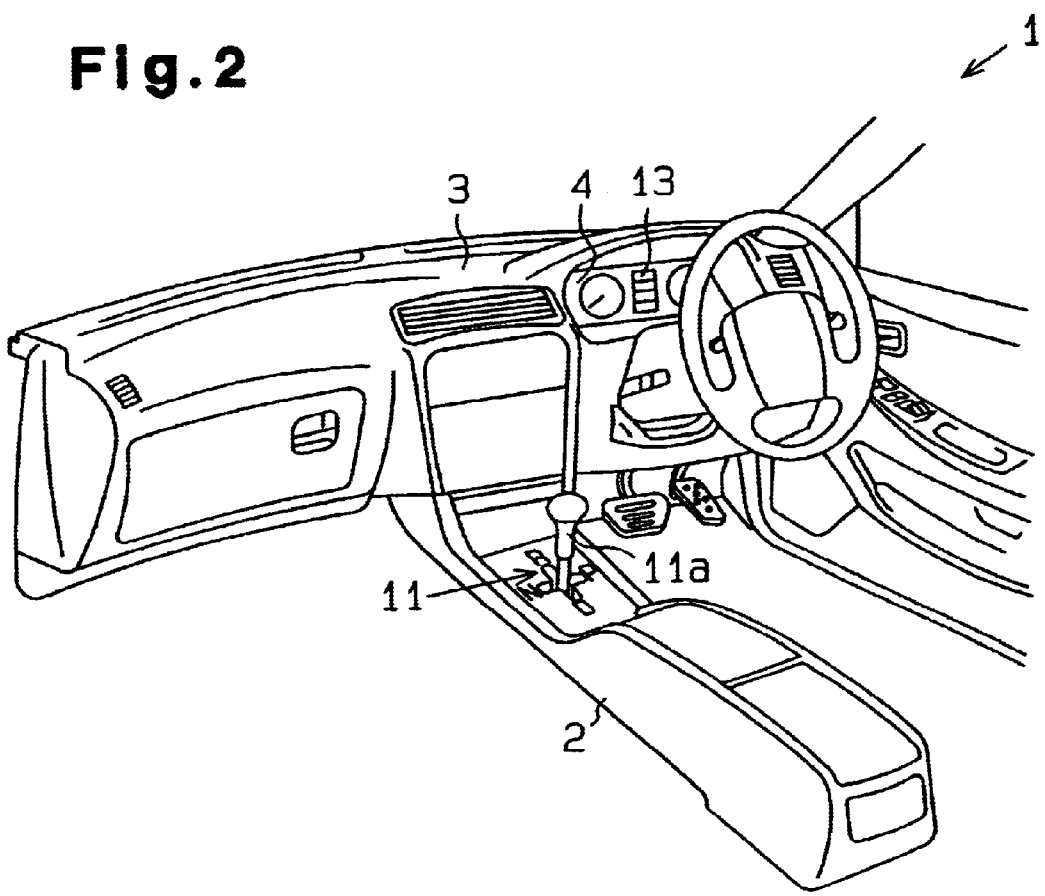
FIG. 2 is a schematic perspective view showing a passenger compartment of the vehicle.

As shown in FIG. 2, the operation body 11 has a lever operation member 11a that is arranged on a center console panel 2. The operation member 11a is arranged so as to be movable to the front, rear, left, and right directions and is normally arranged at an intersecting position (neutral position). When the operation member 11a is moved in the front direction, the "P" range is set, and when the operation member 11a is moving in the rear direction, the "N" range is set. When the operation member 11a is moved in the right direction (toward the passengers seat), the "R" range is set, and when the operation member 11a is moved in the left direction (toward the driver's seat), the "D" range is set. The shift range is shifted in accordance with the moved direction of the operation member 11a.

The display 13 is arranged on a combination meter 4 of an instrument panel 3 and is an indicator for displaying the shift range. The display 13 displays the shift range that is presently selected in accordance with a control signal output from the SBW-ECU 12.

The transmission hydraulic actuator 14 is a structural element of an automatic transmission (hereafter, referred to as transmission) 21 and has a plurality of electromagnetic control valves (not shown) that are operated by electric signals. When each electromagnetic control valve of the actuator 14 controls the supply and discharge of operational oil supplied from a hydraulic pump, the connection of a gear train is shifted. The connection of the gear train is shifted between neutral "N", parking "P", drive "D" and reverse "R".

The range position detection device 15 is arranged in a housing of the transmission 21 to detect the connection condition (P, N, D, R) of the gear train and provide a detection signal to the SBW-ECU 12.

Figure 3:
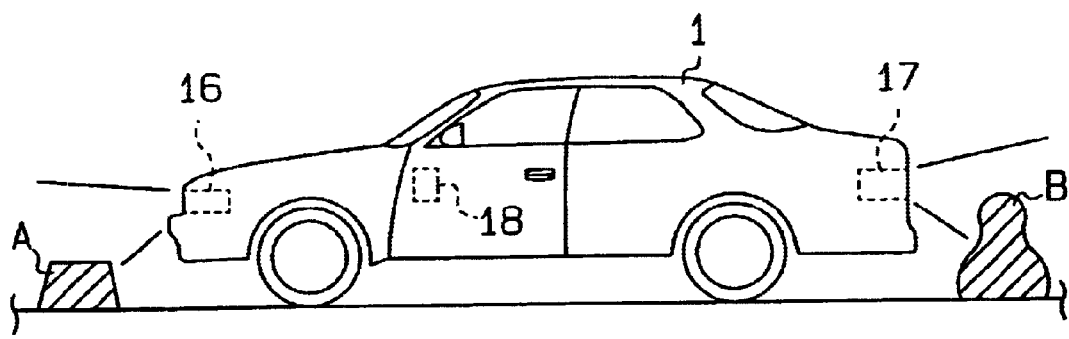
FIG. 3 is a schematic side view of the vehicle.

As shown in FIG. 3, the front camera 16 is arranged on the front end portion (e.g., near the front grill) of the vehicle 1, monitors a predetermined area of the front side of the vehicle, and provides the monitor information to the SBW-ECU 12. The rear camera 17 is arranged on the rear end portion (e.g., near the rear bumper) of the vehicle 1 and monitors a predetermined area of the rear side of the vehicle and provides the monitor information to the SBW-ECU 12. The predetermined space is set to include areas that are blind spots when a driver is seated on the driver's seat. A CMOS camera can be employed as each of the cameras 16, 17.

The warning device 18 is preferably a buzzer provided in the passenger compartment of the vehicle 1 and is operated in accordance with a driving signal output from the SBW-ECU 12.

The SBW-ECU 12 has a microcomputer (not shown) that controls the transmission hydraulic actuator 14 in accordance with a control program, which is prestored in a ROM (not shown), to shift the connection of the gear train. The SBW-ECU 12 controls the transmission hydraulic actuator 14 in accordance with the operation signal from the shift operation body 11 and the detection signal from the range position detection device 15.

For example, when the operation member 11a of the shift operation body 11 is moved to the "D" position, an operation signal indicating the movement position is provided from the shift operation body 11 to the SBW-ECU 12. The SBW-ECU 12 drives the transmission hydraulic actuator in accordance with the operation signal and shifts the connection of the gear train to drive "D". An automatic driving mode, in which different gear ratios are automatically selected for the gear train, is set in the drive "D". In drive "D", a transmission electronic control unit (ECT-ECU) 22, which is electrically connected to the SBW-ECU 12, shifts the connection of the gear train in accordance with a known control method on the basis of the vehicle velocity and the throttle angle.

Figure 4:
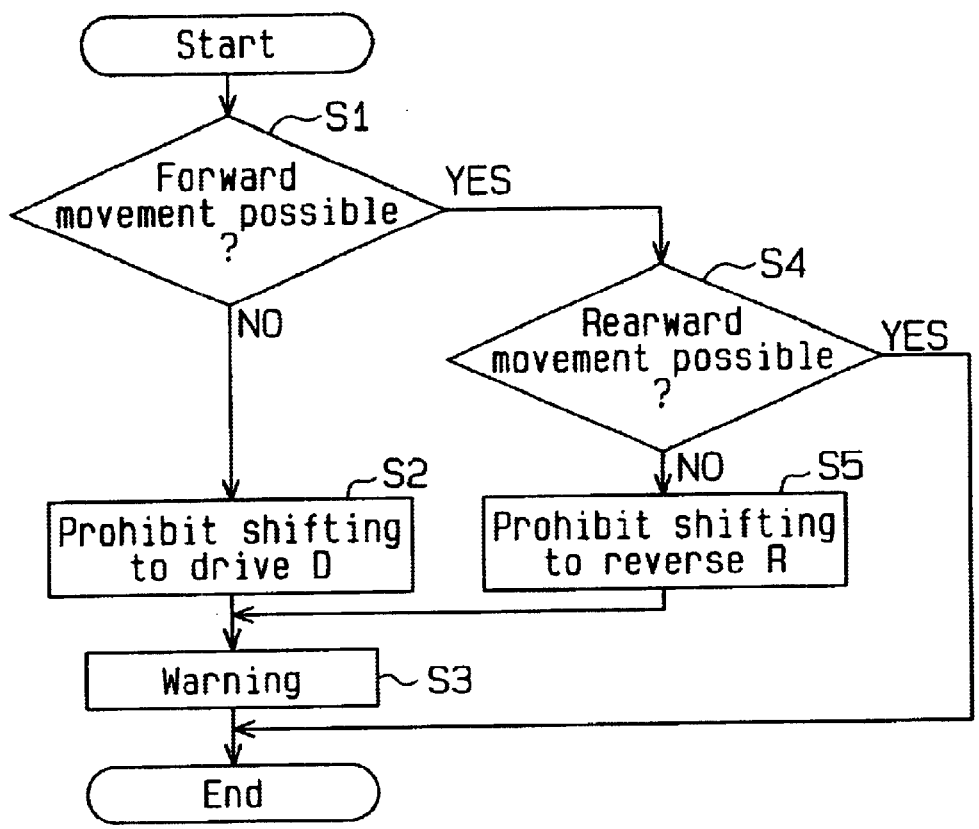
FIG. 4 is a flowchart illustrating the operation of the control apparatus of FIG. 1.

The SBW-ECU 12 receives image output signals from the front camera 16 and the rear camera 17 and executes shift prohibition control. The shift prohibition control will now be discussed with reference to the flowchart of FIG. 4. The shift prohibition control is repeatedly executed for every predetermined time according to a program stored in a ROM of the SBW-ECU 12. The program can be stored in a computer readable storing medium other than the ROM.

First, in step S1, the SBW-ECU 12 determines whether the vehicle 1 may move forward on the basis of the image information from the front camera 16. That is, the SBW-ECU 12 determines whether forward movement of the vehicle 1 would be obstructed (e.g., whether there is an obstacle or a ditch into which a wheel may fall). For example, when determining that there is an obstacle A in front of the vehicle 1 as shown in FIG. 3, the SBW-ECU 12 proceeds to step S2.

In step S2, the SBW-ECU 12 prohibits the shifting of the connection of the gear train to drive "D". In other words, even when the operation member 11a of the shift operation body 11 is moved to the "D" position, the SBW-ECU 12 does not shift the connection of the gear train to drive "D". That is, the SBW-ECU 12 invalidates the operation signal of the "D" position. After completing step S2, the SBW-ECU 12 proceeds to step S3.

In step S3, the SBW-ECU 12 provides a drive signal to the warning device 18 and drives the warning device 18. That is, an alarm goes off to warn the driver that the shifting to drive "D" is prohibited. After completing step S3, the SBW-ECU 12 terminates the process.

When determining that the vehicle 1 may move forward in step S1, the SBW-ECU 12 proceeds to step S4. In step S4, the SBW-ECU 12 determines whether the vehicle 1 may move rearward. More specifically, the SBW-ECU 12 determines whether forward movement of the vehicle 1 would be obstructed on the basis of the image information from the rear camera 17. When the vehicle 1 may move rearward, the SBW-ECU 12 terminates the process. For example, when determining that there is an obstacle B behind the vehicle 1 as shown in FIG. 3, the SBW-ECU 12 proceeds to step S5.

In step S5, the SBW-ECU 12 prohibits the shifting of the connection of the gear train to reverse "R". In other words, even though the operation member 11a of the shift operation body 11 is moved to the "R" position, the SBW-ECU 12 does not shift the connection of the gear train to reverse "R". That is, the SBW-ECU 12 invalidates the operation signal of the "R" position. After completing step S5, the SBW-ECU 12 proceeds to step S3, drives the warning device 18, and warns the driver that the shifting to the reverse "R" is prohibited.

The vehicle transmission control apparatus 10 according to the preferred embodiment has the following advantages.

(1) When recognizing that forward movement would be obstructed on the basis of the image information from the front camera 16, the SBW-ECU 12 prohibits the connection of the transmission 21 is shifted to drive "D" even when the operation member 11a of the shift operation body 11 is moved to the "D" position. When recognizing that rearward movement would be obstructed on the basis of the image information from the rear camera 17, the SBW-ECU 12 prohibits the connection of the transmission 21 to reverse "R" even when the operation member 11a of the shift operation body 11 is moved to the "R" position. Therefore, when there is an obstacle, movement toward the obstacle is prevented. This further improves the safety of the vehicle 1.

(2) When an obstruction to moving is recognized on the basis of the image information of each camera 16, 17, the warning device 18 warns the driver of such situation. This enables the recognition of an obstruction by the driver.

(3) The front camera 16 and the rear camera 17 guarantee the detection of an obstacle or a ditch in front and behind the vehicle 1. The cameras 16, 17 may be connected to the monitor of a navigation system or the like. In this case, the driver can visually confirm the obstacle or the ditch.

(4) The front camera 16 and the rear camera 17 monitor areas including the driver's blind spots when the driver is seated on the driver's seat. This enables the driver to confirm whether there is an obstacle or a ditch in the driver's blind spot.

(5) The front camera 16 and the rear camera 17 are CMOS cameras. Therefore, the vehicle transmission control apparatus 10 is relatively inexpensive.

It should be apparent to those skilled in the art that the present invention may be embodied in many other specific forms without departing from the spirit or scope of the invention. Particularly, it should be understood that the present invention may be embodied in the following forms.

Figure 5:
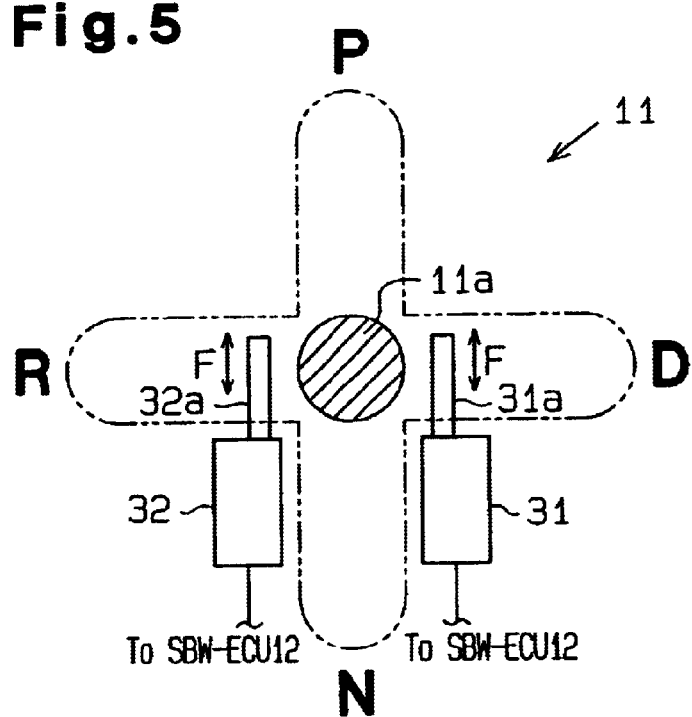
FIG. 5 is a schematic plan view of the shift operation body.

(a) when determining that movement in the front direction or the rear direction is obstructed, the SBW-ECU 12 may prohibit the operation of the shift operation body 11. For example, as shown and FIG. 5, to solenoids 31, 32 that are electrically connected to the SBW-ECU 12 are provided in the shift operation body 11. Plungers 31a, 32a of the solenoids 31, 32 are projected from the solenoids 31, 32 when the solenoids 31, 32 are driven. When the plunger 31a is projected, the solenoid 31 is arranged at a position that restricts the movement of the operation member 11a to the "R" position. When the plunger 32a is projected, the solenoid 32 is arranged at a position that restricts the movement of the operation member 11a to the "D" position. When the SBW-ECU 12 determines that movement in the rear direction is obstructed, the solenoid 31 is provided with a driving signal that pro checks the plunger 31a to restrict the movement of the operation member 11a to the "R" position. When the SBW-ECU 12 determines that movement in the forward direction is obstructed, the solenoid 32 is provided with the driving signal that projects the plunger 32a and restricts the movement of the operation member 11a to the "D" position.

(b) A switch that is operated by a driver when the situation around the vehicle 1 is confirmed may be arranged in the passenger compartment of the vehicle 1. In this case, the shift prohibition process is executed by the SBW-ECU 12 in accordance with the flowchart of FIG. 6. After performing step S3, the SBW-ECU 12 the process proceeds to step S6. In step S6, the SBW-ECU 12 determines whether the confirmation switch has been operated by the driver. When the SBW-ECU 12 determines that the confirmation switch has been operated, the process proceeds to step S7. In step S7, the SBW-ECU 12 ends the shift prohibition and the temporarily terminates the process. When the SBW-ECU 12 determines that the confirmation switch has not been operated in step S6, the process proceeds to S1. In this manner, after the driver confirms the situation around the vehicle 1, the shift prohibition may be ended when the driver wishes to do so.

(c) Instead of the cameras 16, 17, for example, an infrared sensor, an ultrasonic sensor, or a non contact detection device of a radar may be employed.

(d) One of the cameras 16, 17 may be omitted so that only either one of the front direction and the rear direction of the vehicle 1 is monitored.

(e) The cameras 16, 17 may monitor only areas that can be visually confirmed by the driver when the driver is seated on the driver's seat.

(f) The warning device may be controlled by an ECU (e.g., an engine ECU) other than the SBW-ECU 12.

(g) Instead of the warning device 18, for example, an indicator of the combination meter 4 may be used to give warnings. Further, a vibration member (e.g., a vibration motor) may be arranged on the operation member 11a of the shift operation body 11 to vibrate and give warnings to the driver. The warning device is not limited to one that is audible to the driver and may be one that is visual or felt.

(h) The operation member 11a of the shift operation body 11 is not limited to a lever but may also be a rotary switch or a push switch. The shift operation body 11 need not be arranged on the center console panel 2 and may be arranged on the instrument panel 3 or a steering column.

Therefore, the present examples and embodiments are to be considered as illustrative and not restrictive, and the invention is not to be limited to the details given herein, but may be modified within the scope and equivalence of the appended claims.

What is claimed is:

1. An apparatus for controlling a vehicle transmission comprising:
   a detection unit for detecting a situation of at least one of a front side and a rear side of the vehicle and generating a detection signal;
   a shift operation body operated by a driver for generating an operation signal indicating a shift operation position; and
   a control unit connected to the detection unit and the shift operation body for controlling the transmission in accordance with the operation signal, wherein the control unit determines whether movement of the vehicle is obstructed on the basis of the detection signal and invalidates the operation signal to prohibit the operation of the transmission when the movement of the vehicle is obstructed.

2. The apparatus according to claim 1, further comprising a warning unit connected to the control unit for warning the driver that the movement of the vehicle is obstructed.

3. The apparatus according to claim 1, wherein the detection unit is a camera for generating an image signal as the detection signal.

4. The apparatus according to claim 3, wherein the camera generates an image signal of an area including blind spots produced when the driver is seated in a driver's seat.

5. An apparatus for controlling a vehicle transmission comprising:
   a detection unit for detecting a situation of at least one of a front side and a rear side of the vehicle and generating a detection signal;
   a shift operation body operated by a driver for generating an operation signal indicating a shift operation position;
   a control unit connected to the detection unit and the shift operation body for controlling the transmission in accordance with the operation signal, wherein the control unit determines whether movement of the vehicle is obstructed on the basis of the detection signal and generates a driving signal when the movement of the vehicle is obstructed; and
   a prohibiting means connected to the control unit for prohibiting the operation of the shift operation body by the driver in response to the driving signal.

6. The apparatus according to claim 5, further comprising a warning unit connected to the control unit for warning the driver that the movement of the vehicle is obstructed.

7. The apparatus according to claim 5, wherein the detection unit is a camera for generating an image signal as the detection signal.

8. The apparatus according to claim 7, wherein the camera generates an image signal of an area including blind spots produced when the driver is seated in a driver's seat.

9. The apparatus according to claim 5, wherein the prohibiting means is a solenoid.

10. A method for controlling a vehicle transmission comprising the steps of:
   detecting a situation of at least one of a front side and a rear side of the vehicle and generating a detection signal;
   generating an operation signal indicating a shift operation position of a shift operation body operated by a driver;
   controlling the transmission in accordance with the operation signal;
   determining whether movement of the vehicle is obstructed on the basis of the detection signal; and
   invalidating the operation signal when the movement of the vehicle is obstructed to prohibit operation of the transmission.

11. A method for controlling a transmission of a vehicle comprising the steps of:
   detecting a situation of at least one of a front side and a rear side of the vehicle and generating a detection signal;
   generating an operation signal indicating a shift operation position of a shift operation body operated by a driver;
   controlling the transmission in accordance with the operation signal;
   determining whether movement of the vehicle is obstructed on the basis of the detection signal; and
   prohibiting the operation of the shift operation body by the driver when the movement of the vehicle is obstructed.

* * * * *